United States Patent [19]

Maucher

[11] 3,749,213

[45] July 31, 1973

[54] FRICTION CLUTCH ASSEMBLY

[75] Inventor: Paul Maucher, Sasbach, Germany

[73] Assignee: LuK Lamellen und Kupplungsbau GmbH, Buhl/Baden, Germany

[22] Filed: Sept. 20, 1971

[21] Appl. No.: 181,690

[30] Foreign Application Priority Data
Sept. 18, 1970 Luxembourg............................ 61710

[52] U.S. Cl.......... 192/48.8, 192/70.13, 192/70.18, 192/70.29, 192/89 B, 192/99 A
[51] Int. Cl.......................... F16d 13/40, F16d 21/02
[58] Field of Search........................ 192/48.8, 70.13, 192/70.18, 70.29, 89 B, 99 A

[56] References Cited
UNITED STATES PATENTS

| | | | |
|---|---|---|---|
| 2,371,804 | 3/1945 | Cooke............................. | 192/48.8 |
| 3,212,611 | 10/1965 | Ruoff et al........................ | 192/70 X |
| 3,061,062 | 10/1962 | Smirl............................... | 192/70.18 |
| 3,590,968 | 7/1971 | Binder............................. | 192/48.8 |
| 2,993,576 | 7/1961 | Carlin et al................... | 192/70.13 X |
| 3,215,233 | 11/1965 | Smith et al.................... | 192/48.8 X |
| 3,554,342 | 1/1971 | Spokas............................ | 192/70.18 |

*Primary Examiner*—Allan D. Hermann
*Attorney*—Arthur E. Wilfond, Herbert L. Lerner et al.

[57] ABSTRACT

Friction clutch assembly for motor vehicles, tractors, equipment carriers and similar vehicles having a first friction clutch for engaging and disengaging a gear-change transmission, a second clutch for an additional drive, each of the clutches including a friction disc, a spring-loaded pressure plate having a friction surface and being coordinated with each of said friction discs, respectively, an axially fixed structural unit for connecting the second clutch to a flywheel, torque or transmitting means located in a power transmission path between the flywheel or the axially fixed structural unit, on the one hand, and the pressure plates, on the other hand, and a disengaging lever system for each of the clutches, the disengaging lever systems having a respective disengaging means, the pressure plate of the first friction clutch and the pressure plate of the second clutch being mutually exchangeable in another assembled condition of the friction clutch assembly, the pressure plates respectively having receiving and engagement means for receiving the disengaging means of either of the clutches in which the respective pressure plates are then assembled, and engageable by the torque transmitting means in whichever clutch the pressure plates are assembled.

50 Claims, 9 Drawing Figures

FRICTION CLUTCH ASSEMBLY

The invention relates to a friction clutch assembly for motor vehicles, tractors, equipment carriers and similar vehicles, having a friction clutch for engaging and disengaging a gear-change transmission, a further clutch for an additional drive, such as a power take-off. A friction disc is provided for each of the clutches with spring-loaded pressure plates therefor, equipped with friction surfaces, the further clutch being connectible through an axially fixed structural unit to the flywheel of, for example, an internal combustion engine. The clutch assembly is also provided with torque transmitting means which are located in the power transmission path between the flywheel and/or the axially fixed structural unit, on the one hand, and the pressure plates, on the other hand, and each of the pressure plates is equipped with means for receiving the shifting or disengaging means assiciated with the shift or disengaging lever system of the same.

Friction clutches or dual clutches with these features, such as have become known, for instance, through German Petty Patent No. 1,996,835; 1,791,881; 1,780,482; 1,628,607; German Patent No. 819,777; German Published Patent application No. 1,294,228; the German Provisional Patent No. 1,425,326 and French Patent No. 1,461,841; 1,381,432 and 1,364,142 are used, as aforementioned, in special purpose vehicles such as tractors, equipment carriers, construction machinery and the like, wherein the operation of the two clutches can take place separately or sequentially depending on the application and the construction of the shift lever systems. In dual clutches which can be operated sequentially, three levers are as a rule associated with the shift lever system, while in dual clutches which are operated separately two groups of levers are used as a rule, each consisting of three levers. For torque transmission, either leaf spring elements are provided, or the pressure plates are provided with radial profiles, such as projections, which are receivable or engage in oppositely profiled structures, such as in guide slots that are machined into the housing, for example.

The pressure plates for the individual clutches of a dual clutch exhibit in practice considerable differences as to mass or thickness. The pressure plate for the vehicle drive should have a large cast-metal mass in order to assure an appropriately large heat capacity or heat removal from the clutch disc, whereas the pressure plate for the power take-off requires only a small mass, because only relatively little switching or shifting energy is generated therein.

Although a multitude of dual clutches of similar construction exhibit mutually similar dimensions as well as pressure plates and discs of the same size for the respective regular vehicle drive and auxiliary drive, the dual clutches for the individual vehicle types, depending on the type of construction of the latter, are designed so that the respective friction clutches for the vehicle drive are sometimes located on the side coordinated with the flywheel, and again at other times on the side facing away from the flywheel.

Differently constructed pressure plates, actuating and shifting means, differently constructed axially fixed structural units, such as the housing or the intermediate disc, for example, and differently constructed torque transmitting means are therefore required for both type of clutches.

It is accordingly an object of the present invention to assure uniform and therefore economical production of dual clutches of the type described hereinabove, and more specifically so that virtually all of the aforementioned components can be employed as well for either clutch type. Furthermore, it is an object of the invention to assure that, for example, in the case of (plate or disc) spring clutches, such as are described in German Published Patent Application No. 1,294,228, the plate spring in both assembly positions of the pressure plates, always abuts with the larger contact diameter thereof against the pressure plate for the vehicle drive.

With the foregoing and other objects in view, there is provided in accordance with the invention, a dual clutch of the aforementioned type wherein each of the pressure plates has receiving and engagement means at which, in reversed assembly condition, the disengaging or releasing means respectively associated with the other pressure plate as well as the torque transmission means can be received.

In this connection, the arrangement or positioning and the construction of the releasing or disengaging means must be selected so that the engagement means can be accommodated from the standpoint of space requirement.

Although with suitable placement and construction of the disengaging means and the receiving and engagement means for the disengaging means and the torque transmitting means, the features of the present invention are applicable to all kinds of dual clutches, the physical description of the further features of the invention, for the sake of simplicity, will lean, hereinafter, toward such separately operable dual clutches as are shown in the German Published Patent Application No. 1,294,228. However, the invention is in no way limited to such clutches.

Different possibilities for the construction, arrangement and placement of the engagement means are given, of which several particularly advantageous ones will be highlighted hereinafter in accordance with further embodiments of the invention.

If, as is the case in the German Published Patent Application No. 1,294,228, the disengaging means are pivotally connected directly or indirectly at dogs provided at the pressure plates beyond the outer diameter of the friction dics, either the same engagement means can be used as the engagement means for the disengaging means of the other disengaging system, in the case of reversed assembly condition, or additional engagement means can be provided at the pressure plates, such as, for example, dogs, enlargement of the existing dogs, additional pressure pads, etc. for the disengaging means of the other disengaging system, namely, for instance leaf springs, may also be provided in addition or else there are provided for the other assembly position of the pressure plates additional engagement means for this purpose, for example, again dogs with which the leaf springs can engage. It is furthermore possible, depending on the arrangement and construction of these engagement means, to use the latter in the one condition of assembly, for the disengaging means, and in the other condition of assembly, as engagement means for the torque transmission means.

In any event, however, it is advantageous in accordance with another feature of the invention, to provide receiving means, on the one as well as on the other pressure plate, for the receiving means of both systems and/or the receiving means for the torque transmission means that are at the same height relative to the friction surfaces, because, in that case, uniform torque transmission means and disengaging means can be used for both conditions of assembly.

In accordance with a further feature of the invention, the same engagement means is used as the engagement means for both disengaging systems and also as the engagement means for the pressure plates. For such a construction it is particularly practical and, in accordance with the invention, for the receiving means of the one as well as of the other disengaging system and/or the torque transmission means, or the receiving mean for the torque transmission means, respectively, to be provided at both pressure plates respectively at the same angular spacing from one another and/or on the same diameter. Such an arrangement is particularly advantageous also in view of the fact that the use of leaf springs and axially projecting dogs as torque transmission means, as described in the German Published Patent Application 1,294,228, is made possible.

When leaf springs are used as torque transmission means, a further, particularly advantageous embodiment, in accordance with the invention, is provided wherein the means at the pressure plates for the receiving and engagement of the leaf springs are located in the middle of the angular range between two adjacent shifting or disengaging means of the disengaging systems. Since such a construction is not applicable in all cases due to the prevailing space requirements and conditions, it is advantageous, in accordance with the invention, that at each individual pressure plate the receiving and engagement means, respectivley, provided for the disengaging means of the one disengaging system have a relative angular spacing and/or radial spacing against the receiving and engagement means, respectively, provided for the disengaging means of the other disengaging system.

In this connection, it is practical and particularly simple, and in accordance with the invention, to have the disengaging means of the individual disengaging systems offset against each other by an amount which corresponds to the mutual offset of the receiving and engagement means, respectively, at the pressure plates.

Between the adjacent disengaging means of both disengaging systems, there is provided, in accordance with the invention, at each of the pressure plates, the engagement means for the torque transmission means, i.e., the leaf springs, specifically in the middle of the angular range between the receiving and engagement means, respectively, provided at both pressure plates, for the disengaging means of one of the disengaging systems.

In the great majority of cases, it is desirable, in accordance with the invention, for the engagement means for the torque transmission means, i.e., in particular the leaf springs, to be located in registry with and superimposed on one another on the two pressure plates.

A further feature of the friction clutch according to the invention, wherein additional engagement means for the disengaging means of the other disengaging system are provided, is to place the centers of the fastening elements for the leaf springs at the pressure plates in the middle of the angular range between the center of the adjacent disengaging means of one of the disengaging systems.

It is advisable, in accordance with the invention, for the engagement means for the disengaging means of one of the disengaging systems, in reverse assembly condition of the friction clutch assembly, to serve as engagement means for the leaf spring elements, and vice versa. In this regard, it is necessary that the engagement means mentioned have substantially the same mutual radial spacing therebetween.

A further feature of the invention, is to provide pressure plates constructed in such a manner that also in the case of reversed assembly condition, the respective identical engagement means for the fastening elements for the leaf springs are employed.

In the last-mentioned embodiments it is not absolutely necessary for the engagement means at the pressure plates for the disengaging means of the two disengaging systems to be offset against each other; that is, it can be advisable, according to the invention, in various cases to dispose these enagement means radially behind one another or in series.

Furthermore, the engagement means for the disengaging means of both disengaging systems can even be situated, in accordance with the invention, substantially in registry, as viewed in axial direction, when assurance is provided that the disengaging means are functionally operable, for example, by inserting screws, rivets or the like, into those bores, that is, the receiving and engagement means, into which, in reversed assembly condition, the disengaging elements of the other disengaging system, which are constructed as tie rods, would be inserted or with which they would be engaged. A pin having a diameter larger than the hole, can also be used, in accordance with the invention.

It is also advisable, in accordance with the invention, to arrange the disengaging means of one of the disengaging systems substantially in registry with and over those engagement means to which the leaf springs are fastened at the pressure plates. In that case, the disengaging means of this disengaging system, can, for instance, rest on the rivet heads of the fastening elements for the leaf springs.

In this regard, it is particularly advantageous, according to the invention, that the engagement means for the disengaging means of at least one of the lever systems and the engagement means for the leaf spring elements are provided at a common element of the pressure plate, for instance, a dog.

As mentioned hereinbefore, most of the features of the present invention are applicable to all kinds of dual clutches, regardless of whether the clutch is constructed as a sequantial clutch with three layers, for example, or as a separately operable clutch with six levers, for example, or whether leaf springs or other elements are used for the transmission of the torque.

However, the invention can be realized in particularly simple manner, in accordance with another feature thereof, namely in a clutch assembly in which a plate spring is provided between the two pressure plates and bears against dogs or bead-like projections at the pressure plates, and in which the flywheel of an internal combustion engine serves as friction counter-surface for one of the friction discs, while the friction counter-surface of the other friction disc is located in the housing which at least partially encloses the clutches, and that for each of the clutches, a disengaging system with one or two-warm levers is provided, the levers being pivoted in the housing, the one-arm levers exerting pressure on one of the pressure plates, and the two-arm levers exerting a pull on the other pressure plate when, in such a clutch assembly, the one-arm levers form a knife-edge bearing, with a respective bearing element provided at the housing.

A particularly advantageous construction of the knife-edge bearing, in accordance with the invention, is obtained by constructing the bearing elements as bearing blocks which have a wall which projects substantially in direction of the axis of the clutch assembly and extends in peripheral or tangential direction, at least one profiled portion thereof being provided against which a suitable counter-profiled portion of the levers is in engagement. Thereby, the levers can be secured in the peripheral, axial and radial direction at the bearing block. The levers, as well as the bearing blocks can be formed of sheet metal profiled members.

It is furthermore particularly advantageous and simple, with clutches of the aforementioned general construction according to the German Published Patent Application No. 1,294,228 as well as for implementing the concept on which the present invention is based, to provide the levers with a contact part for a pressure pin radially within the bearing blocks, the pressure pin being slidingly held in a guide of the housing and having an end facing away from the contact part and abutting the receiving and engagement means, respectively, of the one pressure plate.

It is advisable to construct the contact part, in accordance with the invention, so that it is adjustable in height, in order to be able to adjust the time of disengagement of this one pressure plate, to be able to readjust in the case of wear, and to insure uniform alignment of all three levers of this lever system. For this purpose, the contact part is arranged in a threaded bushing provided in the lever. In this connection, it is especially simplified, according to the invention, to provide the threaded bushing with a flange which abuts against the side of the lever facing toward the housing, while a counternut is provided in the other side of the lever. The contact part is thereby adjustable in height and, furthermore, a positive connection between the contact part, the threaded bushing and the lever is attainable.

When the leaf springs are secured, in accordance with the invention, so that at least one of the leaf spring elements for one of the pressure plates is fastened at the housing, it is advisable, in accordance with the invention, to fasten the bearing blocks mentioned and the leaf springs for at least one of the pressure plates, to the housing by means of a common fastening element, such as a screw, for example.

With the aforementioned clutches, in accordance with another feature of the invention, the bearing of the two-arm levers of the other disengaging system, whereby these levers engage tension elements with their radially outer lever arm, is constructed in the form of a rocker bearing.

The rocker bearing support for the levers of this lever group is realized in a particularly simple manner, according to the invention, by having these levers surround a pin disposed substantially parallel to the axis, and received in the housing. It is particularly simple to provide this pin, in accordance with the invention, with a knurl, and to press or drive it into a bore formed in the housing.

In such a case, the two-arm levers can also be in the form of profiled sheet metal parts.

In order to secure these levers in the radial direction against the effect of centrifugal force, in accordance with an added feature of the invention, the pin is received in a hole formed in the levers and that is oval in radial direction. As viewed in direction of the periphery, the hole has a respective diameter matching the pin diameter, the radially inner region of the oval hole formed in the levers, providing a contact surface for the pins.

In accordance with yet another feature of the invention, these levers rest on a washer arrounding the pin or a plate or the like, in order to avoid direct contact with the casting. In this connection, it is particularly appropriate if the plate, the washer or the like is formed of wear-resistant material, such as a case-hardened material.

In order to assure trouble-free rolling motion of the lever, in accordance with the invention, the plate, the washer, or the like has a convex surface. On the other hand, the lever can also be provided, in accordance with the invention, at the surface of contact, with a cambered or rounded convex surface or the like which faces the rolling or contact surface and with which the lever rests on a flat or also cambered plate, a washer or the like.

In order to prevent the washer, plate or the like, from twisting relative to the lever or the housing, respectively, it has been found to be particularly advantageous, in accordance with the invention, to provide means protecting against torsion between the lever and the plate. This protection device against torsion, which is of particular advantage in the case of convex plates or washers, is formed, for example, by providing the sheet metal lever with lateral walls that are directed toward the housing for stiffening purposes and extend at least partially over the plate or disc.

The rocker bearing for the two-arm levers can, however, be formed, in accordance with other features of the invention, also by a spherical element such as a ball, a roller, cylinder or the like, or can be a member having a surface formed in a similar manner, on which the lever rests with a correspondingly formed counter-profiled surface and can execute the rolling motions.

A rocker bearing support can be formed also by providing at the lever, in accordance with the invention, an extension arm which extends substantially in direction of the axis of the clutch assembly and which bears against the housing or engages in a recess formed in the housing, in which case it is advisable to provide in this recess a plate, a washer or the like of wear-resistant material with which the corresponding extension arm is engageable. The extension arm is formed, for example, by a bracket consisting of the material of the lever, or by an angle fastened to the lever or the like, it being desirable that the contact area be constructed as a knife edge and that the wear-resistant support such as, for example, the plate, washer or the like, can be formed at least in part with a V-shaped groove.

A knife-edge support for these two-arm levers is implemented also, according to the invention, by a bearing part which is fastened to the housing and has a wall which projects substantially in axial direction of the clutch assembly, extends in peripheral direction and has at least one profiled portion, against which the lever abuts with correspondingly counter-profiled parts. Further in accordance with the invention, the profiled parts are so formed that the lever is secured both in peripheral direction as well as in radial direction.

As mentioned hereinbefore, such a support of the levers is particularly advantageous because the levers can then be manufactured from relatively inexpensive sheet metal profiled parts.

In accordance with additional features of the invention, the levers of both lever systems are provided with means for guiding the levers in the pivoting direction thereof and more specifically in the case of the one-arm levers, radially within the contact parts and, in the case of the two-arm levers, preferably within their bearing areas or rocker bearings, respectively.

Further in accordance with the invention, stops are provided in the radially inner lever region for limiting the tilting or pivoting motion of the levers in direction away from the housing. Additional features of the invention are to form the guide means and/or the stop means in the shape of a pin, the shaft of the pin serving as the guide means and the pin head as the stop means.

When the pin is used as the guide means, the stop for the lever can, however, also be formed, in accordance with the invention, by a snap ring which is inserted into the shaft of the pin. The mounting and assembly of such a pin in the housing is particularly simple, when the pin is provided with a knurl, according to the invention, and the knurl portion is driven or pressed into a hole formed in the housing. Other types of press fits can, of course, also be effected, for example, by means of bushings, such as corrugated or slotted bushings, or the like.

A screw disposed in the housing can also be used as stop or guide means, respectively, in accordance with another feature of the invention.

In the friction clutches mentioned hereinbefore, it has already become known to use spring clips for the tensioning of the levers, one arm of the spring clips bearing against the housing, and the other arm against the lever. A particularly advantageous construction is obtained, according to a further feature of the invention, when the arm of the spring clip bearing against the lever abuts a surface of the lever at such an inclination that a resultant is produced which causes the intermediate section between the two arms, such as the turn of the spring coil, to engage the housing in all operating positions of the levers.

It is believed to be apparent that the invention can be implemented with the manner of construction and operation of a dual clutch assembly described hereinabove in an especially simple manner and that, furthermore, considerable simplifications and improvements as well as economical modes of manufacture thereof are provided as compared to the clutch assemblies of the same general type known herebefore. However, as noted hereinbefore, the invention is not limited only to clutch assemblies according to the German Published Patent Application No. 1,294,228, which has been referred to for the purpose of simplifying the disclosure herein.

Other features which are considered as characteristic for the invention are set forth in the appended claims.

Although the invention is illustrated and described therein as embodied in friction clutch assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 3:
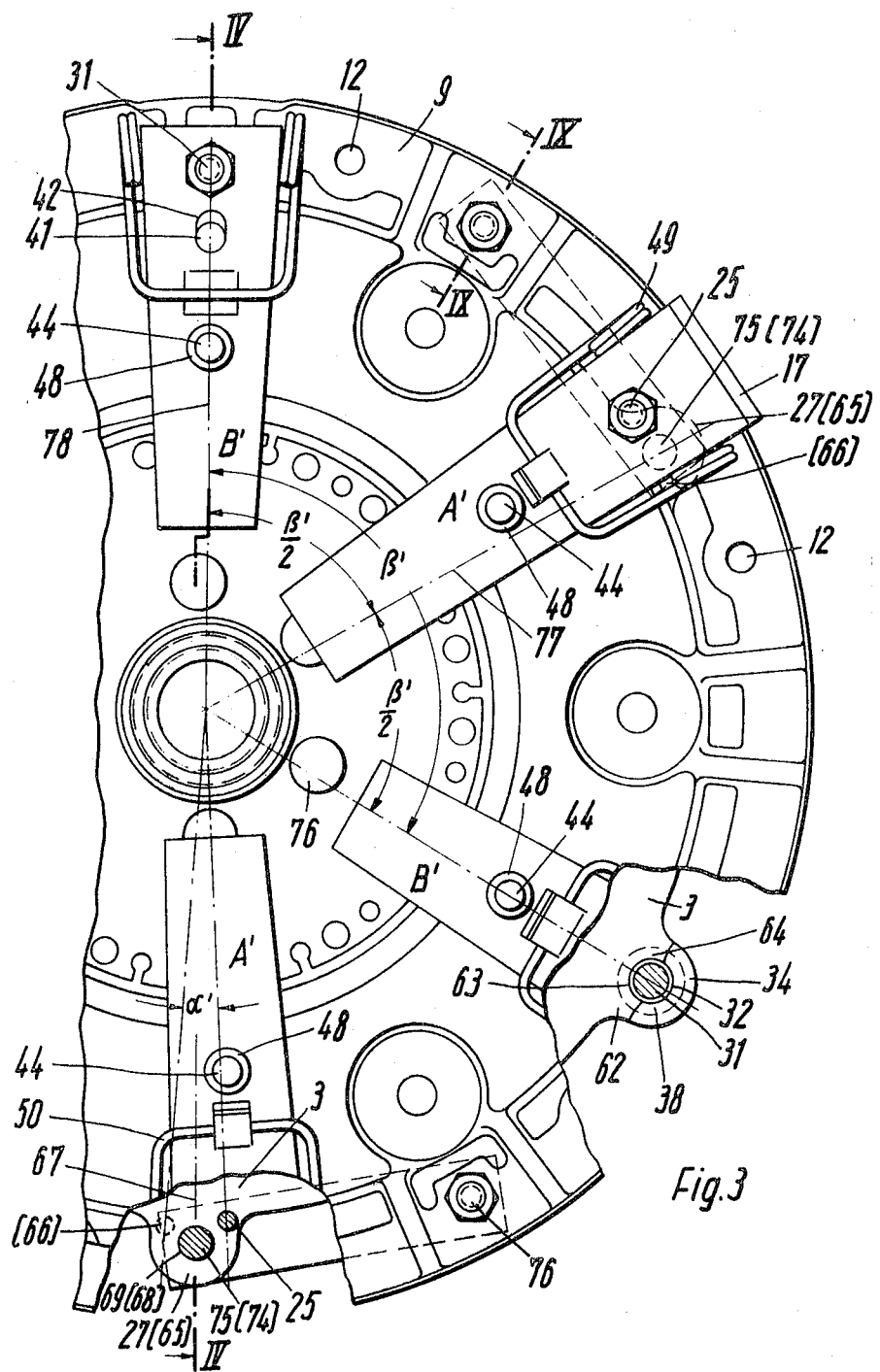
FIG. 3 is a view similar to FIG. 1 of another embodiment of the dual clutch.

The general construction of the clutches corresponding to that of the aforementioned German Published Patent Application are shown in the drawings. Both embodiments of the clutches of FIGS. 1 and 3 are substantially of the same construction, but have differently disposed engagement devices for the shifting or disengaging means and torque transmission means; these different constructions and arrangements will be discussed hereinafter in greater detail.

Referring now to the drawings and more particularly to FIGS. 1 to 4 thereof, there is shown two dual clutch assemblies, each having a clutch A for engaging and disengaging a gear-change transmission and a clutch B for engaging and disengaging a power take-off. Each of the clutches A and B are provided with friction discs 1 and 2 and pressure plates 3 and 4 which are equipped with friction surfaces. Between the two pressure plates 3 and 4, there is disposed a plate or disc spring 5 which bears against dogs or bead-like projections 6 and 7, respectively, formed on the two pressure plates 3 and 4, so that the friction discs 1 and 2 are pressed against friction countersurfaces, specifically against the friction countersurface 8 provided at the housing 9 and against the friction countersuface 10 of the flywheel 11. The housing 9 is fastened to the flywheel 11 by screws (not shown), which pass through the fastening holes 12. To raise the pressure plates, two groups of levers A' and B', each consisting of three levers, are distributed over the circumference of the housing 9, and are pivotally mounted on the latter.

The levers A' are one-armed and are disposed in such a way that if they are turned in the direction of the arrow $a$ they exert a pressure on the pressure plate 3 and raise the latter off the friction disc 1. The levers B' are two-armed and are turned for the purpose of disengaging or releasing the clutch, in the direction of the arrow $b$ and accordingly exert a pull through tension elements on the pressure plate 4, so that the latter is lifted off the disc 2 against the biasing force of the plate spring 5.

Figure 1:
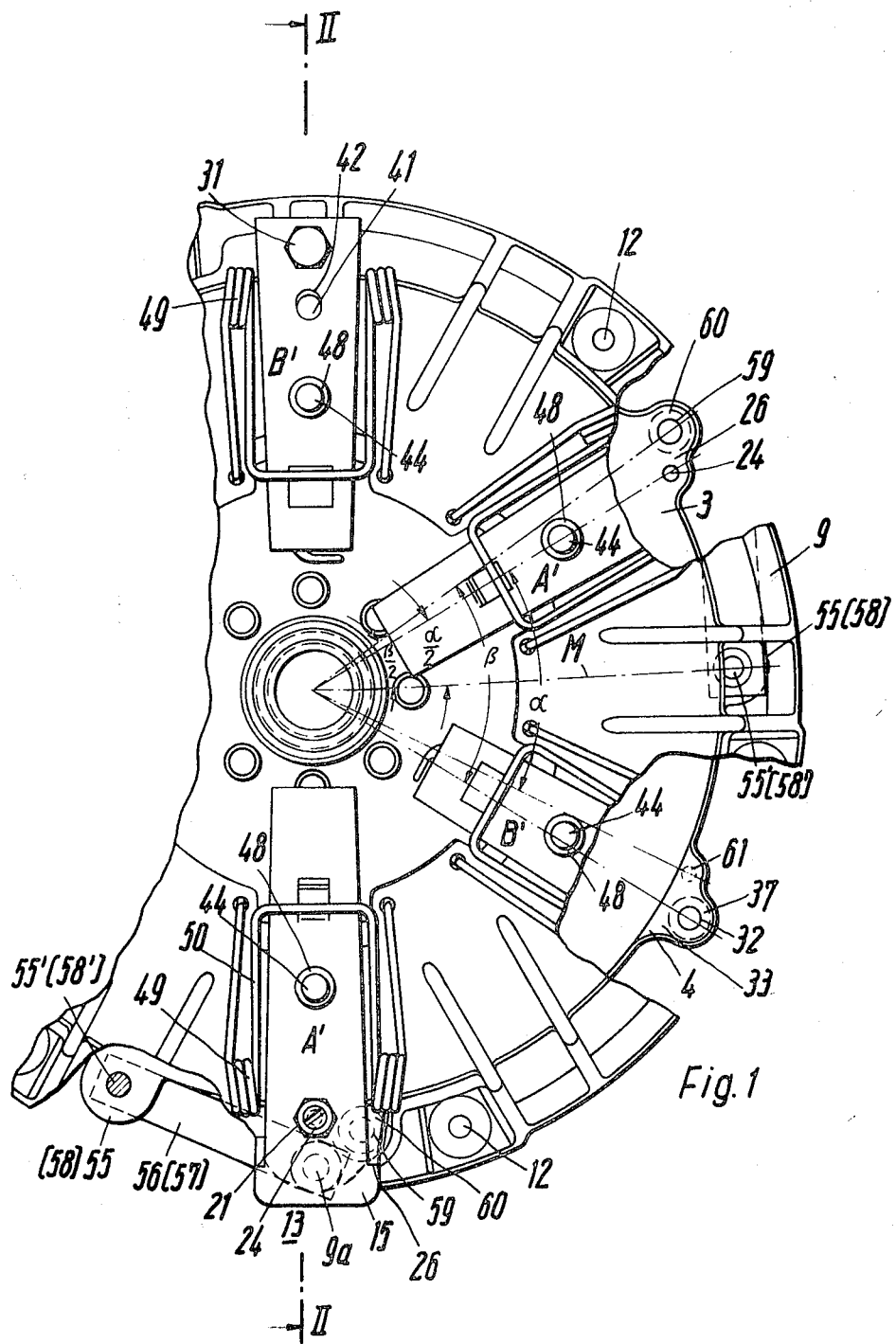
FIG. 1 is a side view of an embodiment of the dual clutch of the invention, partly broken away to show particular details thereof.
Figure 2:
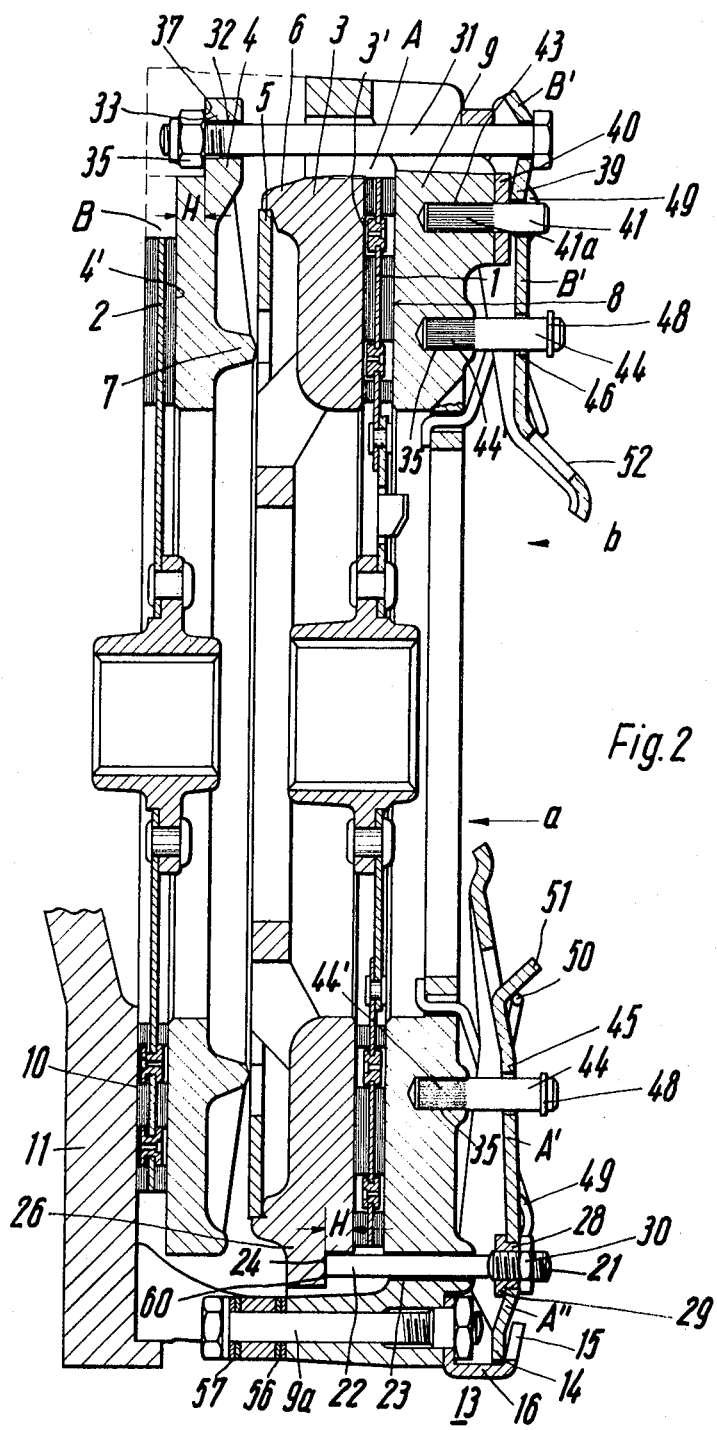
FIG. 2 is a cross-sectional view of FIG. 1 taken along a diametral plane thereof represented by the line II — II, in the direction of the arrows.

The levers A' of FIGS. 1 and 2 form a knife-edge bearing, through their radially outward extending lever arm A'', with a support part 13. A radially directed surface 15, which is provided at the wall 16, overlaps the knife edge 14 of the levers A'.

Figure 4:
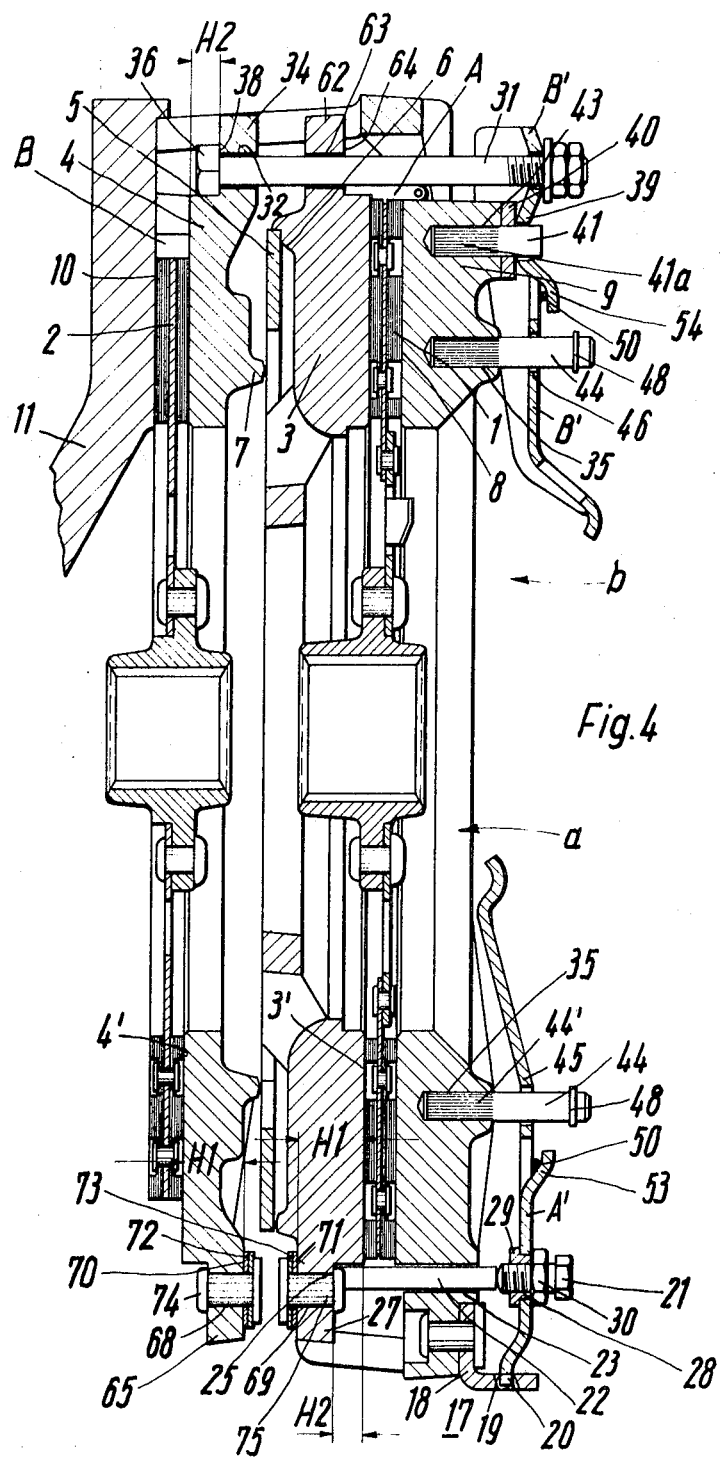
FIG. 4 is a view similar to FIG. 2 taken along the line IV — IV in FIG. 3.

The levers A' according to FIGS. 3 and 4 together with a support part 17, which is constructed as a bearing block, forms a knife-edge bearing.

Figure 5:
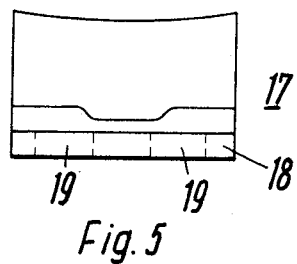
FIGS. 5 to 7 are, respectively, elevational, plan and sectional views of a detail, namely the support member 17 of the embodiment of FIGS. 3 and 4.
Figure 7:
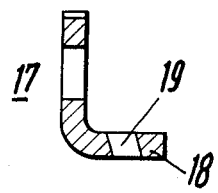
Figure 6:
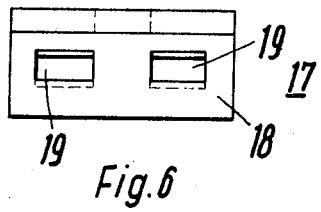
Figure 8:
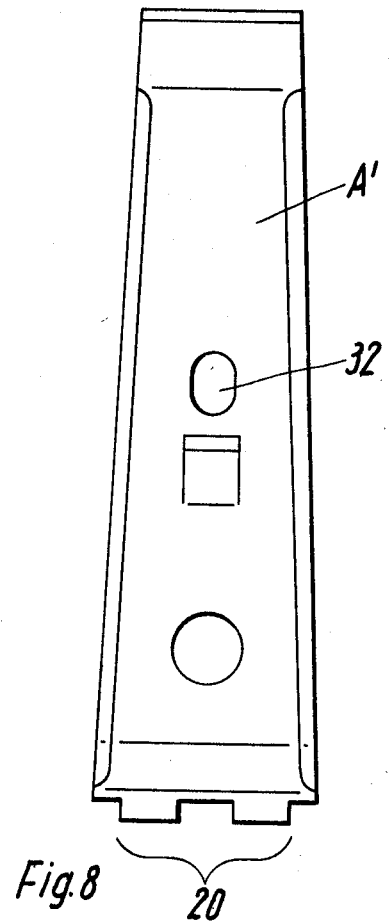
FIG. 8 is an enlarged plan view of another detail of FIGS. 3 and 4, namely the lever A'.

With reference to FIGS. 5 to 7, this support part 17 is described in greater detail, while the lever A' is described in greater detail in reference to FIG. 8.

The support part or bearing block 17 has a wall 18 which projects substantially in the direction of the axis of the clutch assembly and extends in the peripheral or tengential direction. The bearing block is formed with profiled portions such as cutouts 19, at which the lever A' abuts with correspondingly shaped counterprofiled matching parts 20. The levers A' are thereby secured at the bearing block 17 in peripheral direction, axial direction and radial direction.

Radially within the bearing blocks 13 and 17 in FIGS. 1 to 4, the levers A' have a contact element 21, in one instance a headless screw and in the other instance a regular screw that acts upon a pressure pin 22 which functions as releasing or disengaging means for the levers of the one lever system A'. The pin 22 is held in a guide 23 of the housing 9 with a sliding fit. The end of the pin 22 facing away from the contact element 21 is seated on the take-up means 24 (FIGS. 1 and 2) or 25 (FIGS. 3 and 4), these take-up or engagement means 24, 25, respectively, being provided on dogs 26 (FIGS. 1 and 2) and 27 (FIGS. 3 and 4) formed on the respective pressure plates 3.

The contact elements 21 is adjustable in height by means of a threaded sleeve 28 formed with a flange 29, and a counternut 30. The lever A' is clamped between the flange 29 and the counternut 30.

Each of the two-arm levers B' engages, by its radially outer lever arm B'', a pull member serving as a releasing means, namely, a bolt 31. These releasing means 31 extend through a hole 32 formed in a dog 33 (FIGS. 1 and 2) or a dog 34 (FIGS. 3 and 4) of the respective pressure plates 4. A nut 35' and a screw head 36, respectively, abut contact surfaces 37 and 38, reseectively, of the dogs 33 and 34. The holes 32 and the contact surfaces 37 and 38 function as the engagement take-up means, respectively, for the releasing or disengaging means 31 and 35', on the one hand, or 36, on the other hand.

The levers B' are supported in the housing 9 by means of a rocker bearing. They are provided with a substantially spherical surface 39 which engages a hardened washer 40, and are capable of swiveling on this washer. The levers B' are respectively formed with an oval hole 42 which, in spherical direction, matches the diameter of a pin 41 which is received therein, the radially inner region of this oval opening being in abutting engagement with the pin 41 so that the lever B' is thereby secured against the effect of the centrifugal force. The pins 41 are provided with a knurled region 41a which is driven or pressed into a bore 43 formed in the housing 9.

The levers A' as well as the levers B' are each formed with an opening 45, 46 in their radially inner region through which respective pins 44 extend. The pins 44 are formed with knurled portions 44', respectively, which are driven or pressed into bores 35 respectively formed in the housing 9. The pins 44, in conjunction with the openings 45, 46 in the levers A' and B' constitute a guide for the levers in the direction of their swinging or pivoting movement.

On the pins 44, snap rings 48 are provided which serve as stops for limiting the swinging movement of the levers in direction facing away from the housing 9.

The lever systems of both levers are tensioned or clamped by spring clips 49. One of the force arms 50 of the spring clip 49 is attached to the levers, while the other force arm thereof is fixed to the housing 9. The force arm 50 bears against the contour surface 51 and 52, respectively, in FIGS. 1 and 2, and 53 and 54, respectively in FIGS. 3 and 4 of the respective levers A' and B;, that is of such shape that a resultant is produced which causes the center part of the spring clip 49, i.e., the helical turns of each of the springs to abut against the housing 9 in all operating positions of the levers.

In dual clutches according to FIGS. 1 and 2, the pressure plate 3 has receiving and engagement means 24 for the releasing or disengaging means 22, the receiving and engagement means being provided on the dogs 26 of the pressure plate 3. The pressure plate 3 has furthermore three receiving means 55 in the form of dogs provided with holes for engaging and attaching, respectivley, the leaf springs 56. The leaf springs 56 are secured at the housing, together with the leaf springs 57 for the pressure plate 4 and the bearing block 13, by means of a screw or bolt 9a.

The leaf springs 57 are situated beneath and in registry with the leaf springs 56, and are each attached to dogs 58 which are disposed beneath and in registry with the dogs 55, and form with their holes the receiving and engagement means, respectively, for the leaf springs 57.

The pressure plate 3 has further additional receiving and engagement means in the form of holes 59 and area portions 60 shown in dashed lines, on each of the three dogs 26. The shifting or disengaging means 31 of the other shifting or engagement system, with which the levers B' are associated, can be engagede at the receiving and engagement means 59 and 60, respectively, if the pressure plate 3 is to be installed for the regular vehicle drive, i.e., for the transmission of the side of the pressure plate 4.

The engagement means 60 are situated on the same side of the pressure plate 3 as the engagement means 24, but they are offset with respect to the engagement means 24 in radial and peripheral directions.

The pressure plate 4 has, as mentioned hereinbefore, engagement means 32 and 37, which are provided at the dogs 33, for the releasing or disengaging means 31 of the lever group B'. In addition, this pressure plate 4 has also receiving or engagement means 61 for the releasing or disengaging means of the lever group A', the pressure pins 22 being engageable with the take-up or engagement means 61 if the pressure plate 4 for the clutch B of the power take-off is to be installed on the side of the pressure plate 3. The engagement means 61 are offset relative to the engagement means 32/37 in radial direction and are furthermore mutually spaced from one another in peripheral direction, the spacing therebetween corresponding to the spacing which the releasing or disengaging means of the individual releasing or disengaging systems have from each other.

The engagement means 24 and 61 are disposed respectively on the same diameter, and so too are the engagement means 59, 60 and 32, 37.

The engagement means 55, 58 for the torque transmission means, or their centers, respectively, which are simultaneously the centers of the fastening elements, i.e., the rivets 55' and 58', are disposed between the adjacent releasing or disengaging means of the two shifting or disengaging systems I and II, and specifically in the middle of the angular range between the take-up or engagement means disposed at both pressure plates 3, 4 for the releasing or disengaging means of respectively one and the same shifting system I or II, i.e., between the two engagement means 24 and 61 and in the middle of the angular range between the engagement means 60, 59 and 37, 32. In FIG. 1, the angle $\alpha$ shows that angle about which the engagement means 24 and 61 are spaced from each other, and the angle $\beta$ shows that angle about which the engagement means or, the centers of the engagement means 59, 60 and 32, 37 respectively, are spaced from each other. The line M shows the middle of the angular range in which the center of the engagement means 55, 58 or the center of the rivets 55', 58' are situated. The engagement means 24 and 59, 60, located on a common dog 26 of the pressure plate 3, or their centers, respectively, have a mutual angular spacing which corresponds to the difference of $\alpha/2$ and $8/2$. The same also applies to the engagement means located at the dog 33 of the pressure plate 4.

Both the engagement means 24 and 60 of the one pressure plate as well as the engagement means 61 and 37 on the other pressure plate are located at the same height relative to the friction surfaces 3' and 4' of the pressure plates 3, 4. The two dimensions H, as shown in FIG. 2, are therefore equal. Furthermore, the take-up means 55 and 58 for the torque transmission means, i.e., the pads on which the leaf springs 56 and 57 rest, are located practically at the same axial height relative to the respective friction surfaces 3' and 4'. The entire surface of the dogs 26, 33 on which the take-up and engagement means 24, 60 and 61, 37 are located, are plane surfaces which can be produced, together with the surfaces 55, 58 in one lathe operation.

It is apparent that the set of pressure plates 3, 4 can be arranged in reverse assembly position and that, using the same housings, the release or disengaging means as well as the torque transmission means and the engagement measn, respectively, and therefore suitable for this case of reversed assembly installation.

In the case of dual clutches according to FIGS. 3 and 4, reversed assembly it also possible.

In this regard, middle engagement means 25 at the pressure plate 3 serve in the assembly position shown, as mentioned hereinbefore, for the support and engagement of the pressure pins 22, while, for the tension element 31, the hole 32 and the surface 34 serve as the engagement means at the pressure plate 4.

The pressure plate 3 is provided with three additional dogs 62, which are each formed with a hole 63 as well as a surface 64, both of which correspond to the engagement means 32 and 38 on the pressure plate 4. The dogs 62 as well as the holes 63 are situated in registry with the dogs 34 and the holes 32 of the pressure plate 4. The releasing or disengaging means 31 extend through the two holes 63 and 32 of the dogs 62 snd 34 and act only on the pressure plate 4.

On each of the three dogs 65 of the pressure plate 4, which are situated beneat the three dogs 27 of the pressure plate 3, there is located an engagement means 66 corresponding to the engagement means 25, as a mirror image with repsect to the line 67 and on the side of the dog 65 facing the flywheel 11.

Figure 9:
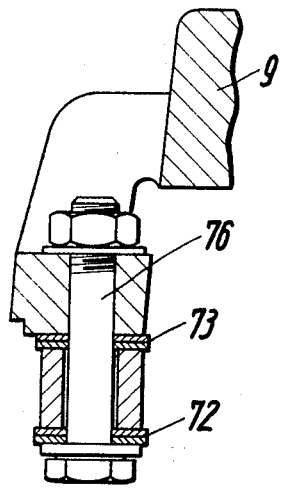
FIG. 9 is a cross-sectional view of FIG. 3 taken along the line IX — IX in the direction of the arrows.

In the middle of the angular range between the centers of the engagement means 25 and 66, there are provided the centers of the engagement means, namely, of the holes 68 and 69 and the support surfaces 70 and 71 for the leaf springs 72 and 73. The angular spacing is indicated at $\alpha'$, while the bisector 67 represents the line on which the leaf springs are fastened on the pressure plates 3 and 4. The leaf springs are screwed to the housing 9 by means of screws 76, as is shown more clearly in the cross-sectional view of FIG. 9 which is taken along the line IX — IX in FIG. 3.

The centers of the fastening elements for the leaf springs are also situated in the middle of the angular range between the centers of the other releasing or disengaging means 31 as is shown by the lines 76, 77 and 78. It is apparent that the angle $\beta'$ corresponds to twice the angle $\beta'/2$ and that the center of the fastening means for the leaf springs 74 and 75 is situated on the bisector 77.

If the pressure plates are reversed, for example, about the axis 67, the pressure pins 22 now come into engagement at the engagement means 66 of the pressure plate 4, while the releasing or disengaging means 31 of the lever system B' engage with the take-up and engagement means 63 and 64, respectively, of the pressure plate 4.

The engagement means 25, 66, 38, 64 as well as 70, 71 are in each case located at the same height relative to the friction surfaces 3' and 4'. The dimensions $H_1$ are equal, and so are the dimensions $H_2$. It is apparent that if the pressure plates are reversed, all of the individual parts or components can be used in the same manner as in the assembly position shown in FIGS. 3 and 4.

I claim:

1. Friction clutch assembly for motor vehicles, tractors, equipment carriers and similar vehicles having a first friction clutch for engaging and disengaging a gear-change transmission, a second clutch for an additional drive, each of the clutches including a friction disc, a spring-loaded pressure plate having a friction surface and being coordinated with each of said friction discs, respectively, an axially fixed structural unit for connecting one of said clutches to a fly-wheel, torque transmitting means located in a power transmission path between the flywheel or the axially fixed structural unit, on the one hand, and said spring-loaded pressure plates, on the other hand, and a disengaging lever system for each of the clutches, the disengaging lever systems having a respective disengaging means, the improvement wherein said pressure plates respectively are provided with receiving and engagement means for receiving the disengaging means of either of the clutches in which the respective pressure plates are then assembled, and engageable by the torque transmitting means in whichever clutch the pressure plates are assembled, whereby the pressure plate of the first friction clutch and the pressure plate of the second friction clutch are mutually exchangeable in another assembled condition of the friction clutch assembly.

2. Friction clutch assembly according to claim 1 wherein the receiving means for the disengaging means of the one clutch and for the disengaging means of the other clutch are spaced respectively an equal angular distance apart on both of the pressure plates.

3. Friction clutch assembly according to claim 1 wherein the receiving means for the disengaging means of the one clutch and for the disengaging means of the other clutch are disposed on both pressure plates on the same diameter, respectively, thereof.

4. Friction clutch assembly according to claim 1 wherein the receiving means for the disengaging means of the one clutch and for the disengaging means of the other clutch as well as the torque transmitting means are spaced respectively an equal angular distance apart on both of the pressure plates.

5. Friction clutch assembly according to claim 1 wherein the receiving means for the disengaging means of the one clutch and for the disengaging means of the other clutch as well as the receiving means for the torque transmitting means are spaced respectively an equal angular distance apart on both of the pressure plates.

6. Friction clutch assembly according to claim 1 wherein the receiving means for the disengaging means of the one clutch and for the disengaging means of the other clutch as well as the torque transmitting means are disposed on the same diameter respectively, on both pressure plates.

7. Friction clutch assembly according to claim 1 wherein the receiving means for the disengaging means of the one clutch and for the disengaging means of the other clutch as well as the receiving means for the torque transmitting means are disposed on the diameter, respectively, on both pressure plates.

8. Friction clutch assembly according to claim 1 wherein the receiving means at both of the pressure plates are located at the same height with respect to the friction surfaces of the respective pressure plates.

9. Friction clutch assembly according to claim 1 including leaf spring means disposed in the power transmission path, and receiving and engagement means located on said pressure plates for receiving said leaf spring means in the middle of the angular region located between two adjacent disengaging means.

10. Friction clutch assembly according to claim 1 wherein at each individual pressure plate, the receiving and engagement means, respectively, provided for the disengaging means of the one disengaging system spaced angularly from the receiving and engagement means, respectively, provided for the disengaging means of the other disengaging system.

11. Friction clutch assembly according to claim 1 wherein at each individual pressure plate, the receiving and engagement means, respectively, provided for the disengaging means of the one disengaging system are radially spaced from the receiving and engagment means, respectively, provided for the disengaging means of the other disengaging system.

12. Friction clutch according to claim 1 wherein, at both pressure plates, the receiving and engagement means for the disengaging means of the same disengaging system are located at the same radial level.

13. Friction clutch according to claim 12 wherein engagement means for torque transmission are located between adjacent disengaging means of both disengaging systems at each of the pressure plates, in the middle of the angular range between the receiving and engagement means, respectively, provided at both pressure plates, for one of the disengaging systems, respectively.

14. Friction clutch according to claim 1 wherein the engagement means for said torque transmission means is located in registry with and superimposed on one another at both pressure plates.

15. Friction clutch assembly according to claim 14 including additional engagement means for the disengaging means of the other disengaging system, said torque transmission means comprising leaf springs, and fastening elements for said leaf springs to said pressure plates, the center of said fastening elements being in the middle of the angular range between the centers of the adjacent disengaging means of one of said disengaging systems.

16. Friction clutch assembly according to claim 15 wherein the engagement means of one of said disengaging systems, in said other assembly condition of the friction clutch assembly, serves as engagement means for said leaf spring elements and vice versa.

17. Friction assembly according to claim 16 wherein the engagement means for the disengaging means of one of said disengaging systems, and the engagement means for said leaf springs are located on a common radially projecting element of said pressure plates.

18. Friction clutch assembly according to claim 16 wherein said engagement means for said leaf springs are located in the middle of the angular range between the engagement means for the disengaging means of one of said disengaging systems.

19. In a friction clutch assembly according to claim 1 wherein a plate spring is provided between said two pressure plates in bearing engagement with bead-like projections formed on said pressure plates, the flywheel serving as friction counter-surface member for one of said friction discs, and the counter-surface of said other friction disc is located in said housing, which at least partly encloses the clutches, the disengaging system for each of the clutches including a one and a two-arm lever, said levers being pivoted in said housing, said one-arm levers exerting pressure on one of said pressure plates, and said two-arm levers exerting a pull on the other pressure plate, said one-arm levers forming a knife-edge bearing with a respective bearing element located at said housing.

20. Friction clutch assembly according to claim 19 wherein said bearing elements are in the form of bearing blocks having a respective wall projecting substantially in direction of the axis of the clutch assembly and extending in tangential direction thereto, said bearing elements having at least one profiled portion, respectively, engageable by a corresponding counter-profiled portion of said levers.

21. Friction clutch assembly according to claim 20 wherein said levers are formed of sheet metal profiled members.

22. Friction clutch assembly according to claim 20 wherein said bearing blocks are formed of sheet metal profiled members.

23. Friction clutch assembly according to claim 20 wherein said levers have a contact part extending radially into said bearing blocks, a pressure pin slidingly held in a guide of said housing and engageable at one end by said contact part, said pressure pin having an end facing away from said contact part and abutting the receiving and engagement means of the one pressure plate.

24. Friction clutch assembly according to claim 23 wherein said contact part is adjustable in height.

25. Friction clutch assembly according to claim 23 wherein said contact part is located in a threaded bushing provided at said lever.

26. Friction assembly according to claim 25 wherein said threaded bushing has a flange which abuts against a side of said lever facing toward said housing, and is provided with a counternut on the other side of said lever.

27. Friction clutch assembly according to claim 26 including a common fastening element fastening said bearing blocks and the leaf springs for at least one of the pressure plates to said housing.

28. Friction clutch assembly according to claim 19 including bearings for said two-arm levers, said bearings being in the form of rocker bearings.

29. Friction clutch assembly according to claim 28 wherein said levers surround a pin extending substantially parallel to the axis of the friction clutch assembly and received in said housing.

30. Friction clutch assembly according to claim 29 whereinr said pin is formed with a knurled portion press-fitted into a bore formed in said housing.

31. Friction clutch assembly according to claim 30 wherein said pin is received in a hole formed in said levers, said hole being oval and having its longer axis extending in radial direction of the friction clutch assembly, said hole, as viewed in peripheral direction having a diameter matching the diameter of said pin, said oval hole having a radially inner edge formed in said levers and providing a contact surface for said pins.

32. Friction clutch assembly according to claim 31 including a platelike member surrounding said pin and engaged by said lever.

33. Friction clutch assembly according to claim 32 wherein said platelike member has a substantially convex surface.

34. Firction clutch assembly according to claim 33 wherein said lever has a flat surface with respect to said platelike member.

35. Friction clutch assembly according to claim 32 wherein said platelike member is formed of wear-resistant material.

36. Friction clutch assembly according to claim 19, including means protecting against torsion between said lever and said platelike member.

37. Friction clutch assembly according to claim 28 wherein said rocker bearing is formed by a spherical element, said lever having a corresponding counter-profiled surface in engagement therewith.

38. Friction clutch assembly according to claim 28 including an extension arm at said lever, extending substantially in direction of the axis of the clutch assembly and bearing against said housing.

39. Friction clutch assembly according to claim 38 including a platelike member of wear-resistant material located at said housing, said extension arm being engageable with said platelike member.

40. Friction clutch assembly according to claim 28, including a bearing part fastened to said housing and forming with said lever a knife-edge bearing, said bearing part having a wall extending substantially in peripheral direction and having at least one profiled portion abuttable by correspondingly profiled parts formed on said lever.

41. Friction clutch assembly accordingto claim 40 wherein said levers are formed of sheet metal profiled members.

42. Friction clutch assembly according to claim 23 including means for guiding said levers in pivoting direction thereof located radial within said contact parts and bearing areas.

43. Friction clutch assembly according to claim 42 including stop means located in the radially inner region of said levers for limiting pivoting movement of said levers in direction away from said housing.

44. Friction clutch assembly according to claim 43 wherein said guide means is formed by a pin.

45. Friction clutch assembly according to claim 44 wherein said stop means comprises a head formed on said pin.

46. Friction clutch assembly according to claim 45 wherein said stop means comprises a snap ring secured to said pin.

47. Friction clutch assembly according to claim 46 wherein said pin is secured by a press fit in a bore formed in said housing.

48. Friction clutch assembly according to claim 47 wherein said pin is formed with a knurled portion with which it is press-fitted into said bore formed in said housing.

49. Friction clutch assembly according to claim 42 wherein said guide means is formed by a screw located in said housing.

50. Friction clutch assembly according to claim 19 including spring clips for tensioning said levers, and spring clips, respectively, having an arm bearing against said housing, and another arm bearing against said levers, said arm bearing against said levers being in abutting engagement with a surface of said levers at such an inclination that a resultant force is produced causing a section of said spring clips located between said two arms thereof to abut said housing in all operating positions of said levers.

* * * * *